US012585983B2

(12) United States Patent
Kurian et al.

(10) Patent No.: US 12,585,983 B2
(45) Date of Patent: Mar. 24, 2026

(54) METHODS AND SYSTEMS FOR TRAINING A MACHINE LEARNING METHOD USING HIGH QUALITY GROUND TRUTH APPROXIMATIONS

(71) Applicant: Aptiv Technologies AG, Schaffhausen (CH)

(72) Inventors: Jittu Kurian, Wuppertal (DE); Jan Siegemund, Cologne (DE); Mirko Meuter, Erkrath (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 1186 days.

(21) Appl. No.: 17/495,332

(22) Filed: Oct. 6, 2021

(65) Prior Publication Data

US 2022/0114489 A1       Apr. 14, 2022

(30) Foreign Application Priority Data

Oct. 12, 2020    (EP) .................................... 20201283

(51) Int. Cl.
*G06N 20/00*              (2019.01)
(52) U.S. Cl.
CPC ..................................... *G06N 20/00* (2019.01)
(58) Field of Classification Search
CPC ...................................................... G06N 20/00
See application file for complete search history.

(56) References Cited

U.S. PATENT DOCUMENTS

| | | | |
|---|---|---|---|
| 10,166,991 B1 * | 1/2019 | Bai ...................... | G08G 1/0112 |
| 2008/0189321 A1 * | 8/2008 | Alles ................... | G01S 5/02526 |
| | | | 342/357.29 |
| 2012/0324341 A1 * | 12/2012 | Dejean .................. | G06F 40/103 |
| | | | 715/243 |
| 2015/0185027 A1 * | 7/2015 | Kikkeri ................. | G01C 25/00 |
| | | | 701/400 |
| 2018/0341017 A1 * | 11/2018 | Kamo ................... | G01S 13/931 |
| 2019/0370606 A1 * | 12/2019 | Kehl ...................... | G06V 10/82 |
| 2020/0217950 A1 | 7/2020 | Unnikrishnan et al. | |
| 2020/0324795 A1 * | 10/2020 | Bojarski ............. | G06V 10/764 |
| 2021/0027103 A1 * | 1/2021 | Brower ................... | G06N 3/08 |

(Continued)

OTHER PUBLICATIONS

Audebert et al., "Joint Learning from Earth Observation and OpenStreetMap Data to Get Faster Better Semantic Maps," 2017 IEEE Conference on Computer Vision and Pattern Recognition Workshops, pp. 1552-1559. (Year: 2017).*

(Continued)

*Primary Examiner* — Eric J. Bycer
(74) *Attorney, Agent, or Firm* — Harness, Dickey & Pierce, P.L.C.

(57) ABSTRACT

A computer-implemented method for training a machine-learning method comprises the following steps carried out by computer hardware components: determining measurement data from a first sensor; determining approximations of ground truths based on a second sensor; and training the machine-learning method based on the measurement data and the approximations of ground truths; wherein approximations of ground truths of lower-approximation quality have a lower effect on the training than approximations of ground truths of higher-approximation quality.

20 Claims, 3 Drawing Sheets

100

(56)           References Cited

U.S. PATENT DOCUMENTS

2021/0229680 A1\*   7/2021   Chakravarty  ............ G06N 3/08
2022/0084228 A1\*   3/2022   Gorban  ................ G05D 1/0088

OTHER PUBLICATIONS

Hajri et al., "Automatic generation of ground truth for the evaluation of obstacle detection and tracking techniques," published Jul. 16, 2018, 7 pgs. (Year: 2018).\*
Schneiner et al., "Automated Ground Truth Estimation of Vulnerable Road Users un Automotive Radar Data Using GNSS," published on May 27, 2019, 5 pgs. (Year: 2019).\*
Jin et al., "A Point-Based Fully Convolution Neural Network for Airborne LiDAR Ground Point Filtering in Forested Environments," IEEE Journal of Selected Topics in Applied Earth Observations and Remote Sensing, vol. 13, 2020, 3958-74. (Year: 2020).\*
"Extended European Search Report", EP Application No. 20201283.7, Apr. 12, 2021, 10 pages.
Maggiolo, et al., "Improving Maps from CNNs Trained with Sparse, Scribbled Ground Truths Using Fully Connected CRFs", Jul. 22, 2018, 4 pages.
Maggiori, et al., "Convolutional Neural Networks for Large-Scale Remote-Sensing Image Classification", Mar. 13, 2017, 14 pages.
Tajbakhsh, et al., "Convolutional Neural Networks for Medical Image Analysis: Full Training or Fine Tuning?", Jun. 2, 2017, 17 pages.

\* cited by examiner

100

Determine measurement data from a first sensor   /102

Determine approximations of ground truths based on a second sensor   /104

Train the machine learning method based on the measurement data and the approximations of ground truths   /106

METHODS AND SYSTEMS FOR TRAINING A MACHINE LEARNING METHOD USING HIGH QUALITY GROUND TRUTH APPROXIMATIONS

CROSS-REFERENCE TO RELATED APPLICATION

This application claims priority to European Patent Application Number 20201283.7, filed Oct. 12, 2020, the disclosure of which is hereby incorporated by reference in its entirety herein.

BACKGROUND

Artificial neural networks are a powerful tool for various tasks, in particular for classification or object detection.

However, artificial neural networks have to be trained, usually using large data sets involving input data and output data which the artificial neural network is supposed to compute based on the input data. For example for artificial neural networks that are to work on sensor data, labelled data (which may be referred to as ground truth) may be required. These labelled data is usually obtained manually, which is cost intense and slow.

Accordingly, there is a need to improve training of (artificial) neural networks.

SUMMARY

The present disclosure relates to methods and systems for training a machine-learning method.

The present disclosure provides a computer-implemented method, a computer system, and a non-transitory computer-readable medium according to the independent claims. Embodiments are given in the subclaims, the description and the drawings.

In one aspect, the present disclosure is directed at a computer-implemented method for training a machine-learning method, the method comprising the following steps performed (in other words: carried out) by computer hardware components: determining measurement data from a first sensor; determining approximations of ground truths based on a second sensor; training the machine-learning method based on the measurement data and the approximations of ground truths; wherein approximations of ground truths of lower-approximation quality have a lower effect on the training than approximations of ground truths of higher-approximation quality.

In other words, approximations of ground truths which have a lower-approximation quality may have less influence on the training.

The method may allow handling inter-sensor perception discrepancies for machine learning without human intervention. For example, the method may provide automatic labelling of imperfect sensor and non-matched radar and lidar data for a machine learning model.

The machine-learning method may for example be an artificial neural network.

According to another aspect, it is provided that approximations of ground truths of lower-approximation quality have a lower effect on the training than approximations of ground truths of higher-approximation quality by using an optimization criterion for the training, wherein the optimization criterion is based on a mapping. The mapping may reflect which regions of ground truth are reliable or not.

According to another aspect, the optimization criterion is further based on an energy map of the measurement data. This additional optimization term may be used to address the shortcomings created by the first optimization term. The energy map may be represented by $f(x_i)$ and may represent the unobserved space According to another aspect, the optimization criterion comprises a cross entropy between the measurement data and the approximations of the ground truths.

According to another aspect, the optimization criterion is based on a sum comprising a first summand based on the cross entropy and a second summand based on the energy map. This may ensure a training of the machine-learning method to the annotated data, and at the same time ensure that the output does not deviate too much from the input data.

According to another aspect, it is provided that approximations of ground truths of lower-approximation quality have a lower effect on the training than approximations of ground truths of higher-approximation quality by filtering out approximations of ground truths of lower-approximation quality.

According to another aspect, the filtering out comprises grouping the measurement data based on a looktype. This may for example be done in the first step described below. The method may provide handling inter-sensor perception discrepancies for machine learning using radar looktypes.

According to another aspect, the filtering out comprises identifying ground truths providing a negative influence on the training. This may for example be done in the second step described below.

According to another aspect, the filtering out comprises determining a reliability map. This may for example be done in the third step described below.

According to another aspect, entries of the reliability map are determined based on whether a perception is similar over the first sensor and the second sensor. For example, the reliability value of each ground truth region may be determined based on whether that region is perceived in a similar way over multiple sensors, for example a RADAR and a LIDAR.

According to another aspect, the machine-learning method is configured to classify objects.

According to another aspect, the approximations of ground truths are determined based on the second sensor using an automated method (for example without human interaction or with only a limited amount of human interaction, which is faster than classification based on the measurement data of the first sensor would be).

According to another aspect, the first sensor is a radar sensor. According to another aspect, the second sensor is a lidar sensor. However, it will be understood that any other two types of sensors may be used.

In another aspect, the present disclosure is directed at a computer system, said computer system comprising a plurality of computer hardware components configured to carry out several or all steps of the computer-implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer-implemented method in the computer system. The non-transitory data storage and/or the memory unit may comprise a computer program for instructing the computer to perform several or all steps or aspects of the computer-implemented method described herein, for example using the processing unit and the at least one memory unit.

In another aspect, the present disclosure is directed at a non-transitory computer-readable medium comprising instructions for carrying out several or all steps or aspects of the computer-implemented method described herein. The computer-readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer-readable medium may be configured as a data storage that is accessible via a data connection, such as an internet connection. The computer-readable medium may, for example, be an online data repository or a cloud storage.

The present disclosure is also directed at a computer program for instructing a computer to perform several or all steps or aspects of the computer-implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
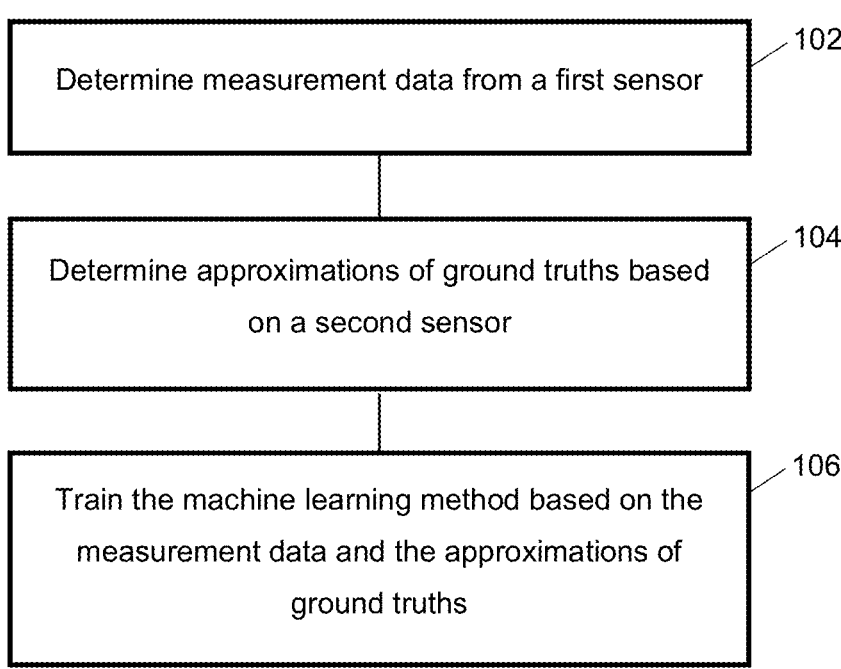
FIG. 1 a flow diagram illustrating a method for training a machine-learning method according to various embodiments.

Various embodiments refer to a problem where, given a two dimensional grid of energy reflections from a radar sensor (for example an automotive radar sensor), a machine-learning method (for example an artificial neural network) is required to predict whether a grid cell is free, occupied or unknown. A commonly used way to solve this problem is to collect large amount of input data, and then manually label them to each corresponding class ("free", "occupied", "unknown"). Usually, a large amount of labelled (in other words: annotated data) may be required, which may be expensive.

Then, using a machine-learning method, the mapping from the input signal to the semantic classes may be learned.

Since radar signals may be non-interpretable for a non-expert, a Lidar sensor may be used to help with labeling. This may mean using a synchronized lidar sensor, and a human may annotate radar data. However, a typical Lidar scan contains hundreds of thousands of points; so manual labeling may be very expensive. To reduce cost, lidar data may be artificially labeled using some mathematical assumptions, since lidar has rich 3$d$ information. In other words, to reduce cost, ground truth may be artificially generated using the data from a laser scanner (lidar sensor) which is synchronized with the radar sensor.

Once such a ground truth is determined, there arises a matching problem between the two sensors. This may be due to the differences between their physical principles and also due to mounting and time synchronization. Therefore, an exact mapping from lidar sensor data to radar sensor data, both in time and space, may not always be feasible. As a result, the ground truth which is generated inexpensively may not align exactly with input data for each grid cell. When a machine learning algorithm is trained with such imperfect data, the results may be unacceptable.

According to various embodiments, methods and system are provided with which a machine learning model may be trained using such imperfect data, and at the same time acceptable results may be reached.

In an exemplary setup, the perception volume of both sensors may be different. Thus the labeled signal from lidar may be different from the signal of radar.

According to various embodiments, the discrepancy between labels and the input signal (i.e. the measurement data, for example input radar signal) may be determined. According to various embodiments, the mapping from input radar signal to output segmentation mask may be learned.

To train a (artificial) neural network to learn the mapping $f(x)=y$, where x may denote the input signal and y may denote the target signal, the cross entropy between the network prediction $f(x)$ and the target variable y may be minimized. According to various embodiments, the input signal x may be a Cartesian grid representation of an environment perceived by an automotive radar sensor. The target variable y may be the grid representation of labels of the same environment created using lidar data.

According to various embodiments, the input signal may be the radar energy and the output signal may be labels created using lidar data. The cross entropy CE in this case may be given by the following equation:

$$CE(f(x),y)=-y \log(f(x))-(1-y)\log(1-f(x)).$$

Minimizing the above value may make the network prediction closer to labels. But it may be seen that there are many structures in labeled data which are not seen by the radar and vice versa.

Using the above measure alone for optimization may force the network to learn some artifacts which may deliver unintended results. This may mean that it may be desired to avoid giving importance to unreliable regions. According to various embodiments, this may be done by first identifying reliable regions of ground truth which can be used for training and then exclude the rest during neural network optimization.

The reliability value of each ground truth region may be determined based on whether that region is perceived in a similar way over multiple sensors, for example a RADAR and a LIDAR.

A first step may be to identify the reliable areas of the ground truth. Let us denote this by the variable $r_i$, where the subscript denotes grid cell i. A ground truth grid cell $y_i \in \{free(0), occupied(1), unknown(2)\}$, That means a grid cell in ground truth can have any of the above three values 0 (indicating the ground truth "free"), 1 (indicating the ground truth "occupied"), or 2 (indicating the ground truth "unknown").

According to various embodiments, it may be started by setting all N ground truth cells to reliable, i.e. $:=1\forall i \in N$. A ground truth grid cell i may be considered unreliable, if there is a conflict between lidar and radar sensor measurements. One possible definition of this conflict is as follows, wherein T1 and T2 are thresholds which are determined empirically for each radar looktype:

$$r_i := 0 \text{ if } x_i > T_1 \&\& y_i \neq 1,$$

$$\text{or } x_i < T_2 \&\& y_i > 0,$$

$$\text{or } y_i == 2.$$

5

T1 may be T_high, which will be described below. $T_2$ may be T_low, which will be described below.

Regions where $x_i > T_1$ may provide hints that that radar may indicate that it is occupied but if $y_i$ is not 1, then the Lidar sensor data may contradict with it. Then the cell may be marked as unreliable.

Similarly, if $x_i < T_2$, then the radar may claim a free cell. But if the Lidar indicates the cell as occupied or unknown, then also the cell may become unreliable.

Now, this may be incorporated in the afore mentioned cross entropy (or cross entropy loss):

$$wCE_i = (-y_i \log(f(x_i)) - (1 - yi)\log(1 - f(x_i)) * r_i,$$

$$wCE = \sum_{i \in N} wCE_i.$$

The above term when optimized may ignore the unreliable regions of ground truth but may not be able to identify and suppress the noise and artifacts present in the radar input signal. This may result in neural network predict incorrect labels for regions which are not even observable due reasons like occlusion. According to various embodiments, this may be avoided may making the network learn the unobserved region of ground truth. The large unobserved region of the ground truth will be mostly noise in radar input signal. To learn this region, another output may be added to the network. The additional output may be denoted as $f(x_i)$. Furthermore, the ground truth may be modified to y as follows:

$$\hat{y}_i = \begin{Bmatrix} 1, & \forall\, y_i == 2 \\ 0, & \forall\, y_i \neq 2 \end{Bmatrix}$$

$$CEunobs_i = -\hat{y}_i \log(\tilde{f}(x_i)) - (1 - \tilde{y}_i)\log(1 - \tilde{f}(x_i)),$$

$$CE\_unobs = \sum_{i \in N} CE\_unobs_i$$

The combined optimization criterion CL (or optimization term), which is minimized when training the network, may then be:

$$CL = wCE + \alpha CE\_unobs,$$

where $\alpha$ may be a scalar weighting factor. The scalar weighting factor $\alpha$ may be tuned based on the results on a validation set, for example by doing cross validation.

According to various embodiments, the prior knowledge about the data (for example radar reflections) may be used to filter out parts of automatically generated ground truth which is expected to harm the model training process. The method may work in three steps:

In a first step, the radar reflections may be grouped based on their looktypes, and a radar frame may be assembled by grouping reflections from radars which report the same looktype.

In a second step, harmful parts of automatically generated ground truth may be identified. For example, given a 2D grid of radar reflections, it may be very likely that grid cells with high reflected energy are occupied. At the same time, grid cells with negligible energy may be likely to be empty or unobserved. Two thresholds T_high and T_low may be introduced for the radar reflected energy to identify those grid cells which are reliably labeled by the automatic ground truth. The above described knowledge may be used to set high importance to cells which have reliable labels.

Thigh may be the minimum energy value above which it may be sure that occluded labels given by automatic ground truth are reliable. T_low may be the maximum energy value, so that for those grid cells with energy less than T_low are reliably labeled as not occupied by the automatic ground truth.

To identify stable T_high and T_low, conditioning based on looktype may be used. It may be observed that reflected energy from multiple radars shows a similar pattern when they belong to same looktype.

In a third step, the above information may be integrated into training. The reliability of each cell may be encoded to a binary value. This may lead to a reliability map, where each cell may be marked as reliable (for example binary value of 1 or true) or not reliable (for example binary value 0 or false). This map may then be used at the time of optimizing the neural network weights to ignore the regions where we suspect corrupt labels. This is done by weighting the loss function (i.e. the function which is optimized when training the neural network) using the reliability map.

FIG. 1 shows a flow diagram 100 illustrating a method for training a machine-learning method according to various embodiments. At 102, measurement data from a first sensor may be determined. At 104, approximations of ground truths may be determined based on a second sensor. At 106, the machine-learning method may be trained based on the measurement data and the approximations of ground truths, wherein approximations of ground truths of lower-approximation quality have a lower effect on the training than approximations of ground truths of higher-approximation quality.

According to various embodiments, it may be provided that approximations of ground truths of lower-approximation quality have a lower effect on the training than approximations of ground truths of higher-approximation quality by using an optimization criterion for the training, wherein the optimization criterion is based on a mapping.

According to various embodiments, the optimization criterion may further be based on an energy map of the measurement data.

According to various embodiments, the optimization criterion may include a cross entropy between the measurement data and the approximations of the ground truths.

According to various embodiments, the optimization criterion may be based on a sum comprising a first summand based on the cross entropy and a second summand based on the energy map.

According to various embodiments, it may be provided that approximations of ground truths of lower-approximation quality have a lower effect on the training than approximations of ground truths of higher-approximation quality by filtering out approximations of ground truths of lower-approximation quality.

According to various embodiments, the filtering out may include grouping the measurement data based on a looktype.

According to various embodiments, the filtering out may include identifying ground truths providing a negative influence on the training.

According to various embodiments, the filtering out may include determining a reliability map.

According to various embodiments, entries of the reliability map may be determined based on whether a perception is similar over the first sensor and the second sensor.

According to various embodiments, the machine-learning method may be configured to classify objects.

According to various embodiments, the approximations of ground truths may be determined based on the second sensor using an automated method.

According to various embodiments, the first sensor may be a radar sensor.

According to various embodiments, the second sensor may be a lidar sensor.

Each of the steps 102, 104, 106 and the further steps described above may be performed by computer hardware components.

Figure 2:
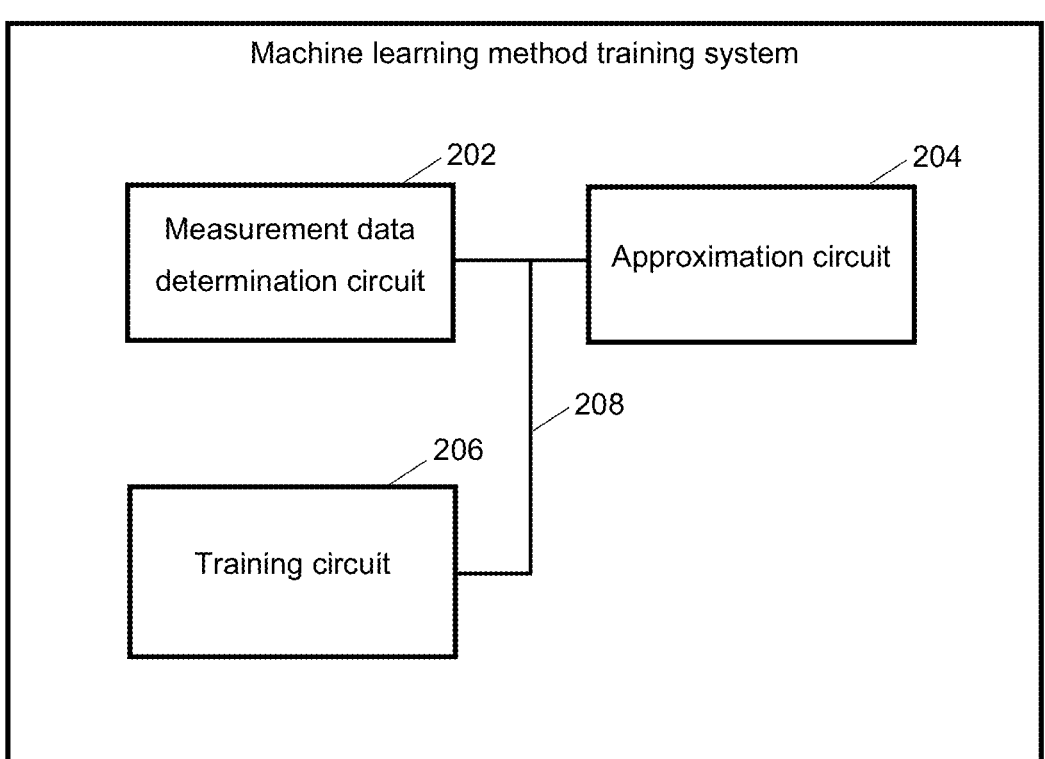
FIG. 2 a machine-learning method training system according to various embodiments.

FIG. 2 shows a machine-learning method training system 200 according to various embodiments. The machine-learning method training system 200 may include a measurement data determination circuit 202, an approximation circuit 204, and a training circuit 206.

The measurement data determination circuit 202 may be configured to determine measurement data from a first sensor.

The approximation circuit 204 may be configured to determine approximations of ground truths based on a second sensor.

The training circuit 206 may be configured to train the machine-learning method based on the measurement data and the approximations of ground truths, wherein approximations of ground truths of lower-approximation quality have a lower effect on the training than approximations of ground truths of higher-approximation quality.

The measurement data determination circuit 202, the approximation circuit 204, and the training circuit 206 may be coupled with each other, e.g. via an electrical connection 208, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 3:
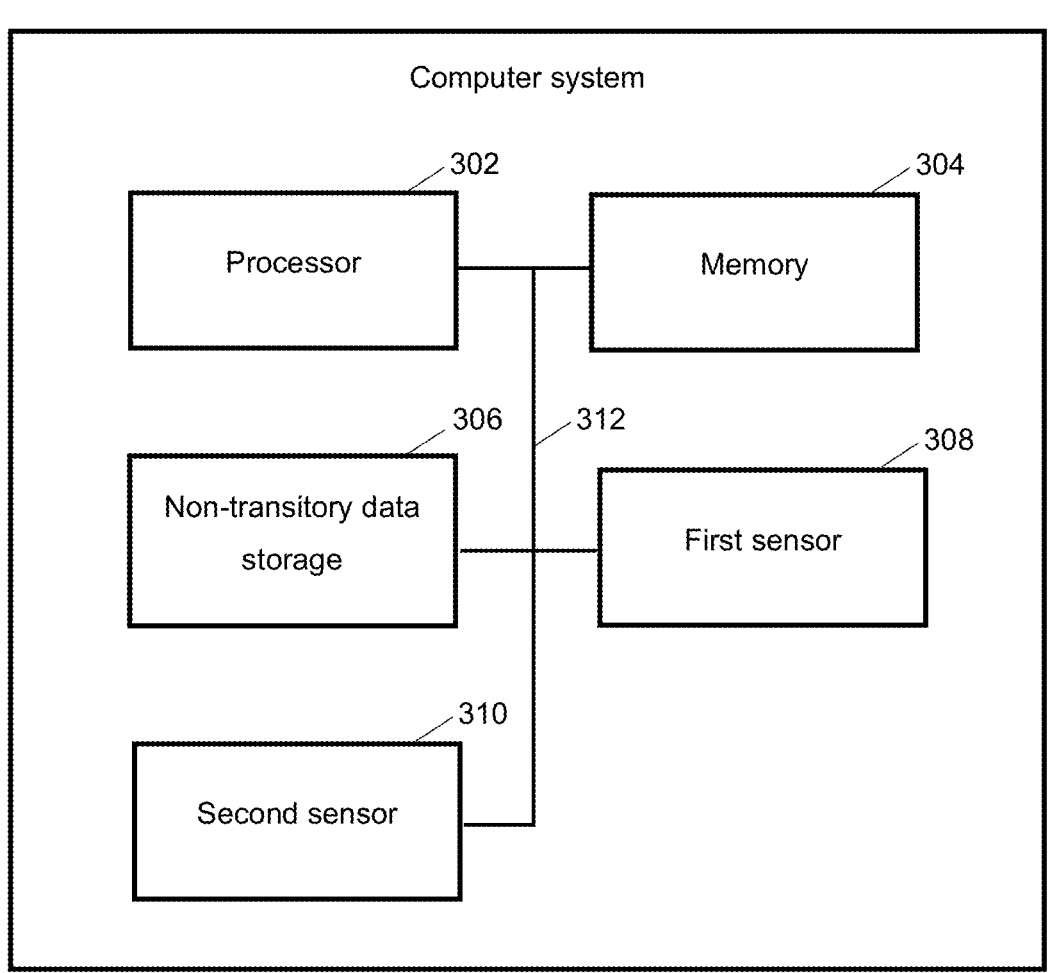
FIG. 3 a computer system with a plurality of computer hardware components configured to carry out steps of a computer-implemented method for training a machine-learning method according to various embodiments.

FIG. 3 shows a computer system 300 with a plurality of computer hardware components configured to carry out steps of a computer-implemented method for path planning according to various embodiments. The computer system 300 may include a processor 302, a memory 304, and a non-transitory data storage 306. A first sensor 308 and/or a second sensor 310 may be provided as part of the computer system 300 (like illustrated in FIG. 3), or may be provided external to the computer system 300.

The processor 302 may carry out instructions provided in the memory 304. The non-transitory data storage 306 may store a computer program, including the instructions that may be transferred to the memory 304 and then executed by the processor 302. The first sensor 308 may be used for determining measurement data. The second sensor 310 may be used to determine ground truths.

The processor 302, the memory 304, and the non-transitory data storage 306 may be coupled with each other, e.g. via an electrical connection 312, such as e.g. a cable or a computer bus or via any other suitable electrical connection to exchange electrical signals. The first sensor 308 and/or the second sensor 310 may be coupled to the computer system 300, for example via an external interface, or may be provided as parts of the computer system (in other words: internal to the computer system, for example coupled via the electrical connection 312).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the machine-learning method training system 200 and/or for the computer system 300.

What is claimed is:

1. A computer-implemented method for training a machine-learning model comprising:
determining measurement data from a first sensor;
determining approximations of ground truths based on data from a second sensor; and
training the machine-learning model based on the measurement data and the approximations of ground truths, wherein a first group of the approximations of ground truths are of lower-approximation quality, the training including training the machine-learning model to a first extent based on the first group of approximations of ground truths of the lower-approximation quality and training the machine-learning model to a second extent based on a second group of the approximations of ground truths that are of higher-approximation quality than the first group, wherein the second extent is greater than the first extent.

2. The computer-implemented method of claim 1, wherein an optimization criterion, based on mapping, is used for the training, the optimization criterion providing that the first group of the approximations of ground truths have the lower effect on the training than the second group of the approximations of ground truths that are of higher-approximation quality.

3. The computer-implemented method of claim 2, wherein the optimization criterion is further based on an energy map of the measurement data.

4. The computer-implemented method of claim 3, wherein the optimization criterion comprises a cross entropy between the measurement data and the approximations of ground truths.

5. The computer-implemented method of claim 4, wherein the optimization criterion is based on a sum comprising a first summand based on the cross entropy and a second summand based on the energy map.

6. The computer-implemented method of claim 1, further comprising:
filtering out ones of the first group of the approximations of ground truths to provide the first group of the approximations of ground truths with the lower effect on the training than the second group of the approximations of ground truths.

7. The computer-implemented method of claim 6, wherein the filtering out comprises filtering out ones of the first group of the approximations of the ground truth based on a looktype.

8. The computer-implemented method of claim 6, wherein the filtering out comprises identifying ones of the first group of the approximations of ground truths as providing a negative influence on the training.

9. The computer-implemented method of claim 6, wherein the filtering out comprises determining a reliability map.

10. The computer-implemented method of claim 9, wherein entries of the reliability map are determined based on whether a perception is similar over the first sensor and the second sensor.

11. The computer-implemented method of claim 1, wherein the machine-learning method is configured to classify objects.

12. The computer-implemented method of claim 1, wherein the approximations of ground truths are determined based on the second sensor using an automated method.

13. The computer-implemented method of claim 1, wherein at least one of:

the first sensor is a radar sensor; or the second sensor is a lidar sensor.

14. A non-transitory computer-readable medium comprising instructions that, when executed, cause a processor of a computer system to:

determine measurement data from a first sensor;

determine approximations of ground truths based on data from a second sensor; and train a machine-learning model based on the measurement data and the approximations of ground truths, wherein a first group of the approximations of ground truths are of lower-approximation quality, the training of the machine-learning model including training the machine-learning model to a first extent based on the first group of approximations of ground truths of the lower-approximation quality and training the machine-learning model to a second extent based on a second group of the approximations of ground truths that are of higher-approximation quality than the first group, wherein the second extent is greater than the first extent.

15. The non-transitory computer-readable medium of claim 14, wherein an optimization criterion, based on mapping, is used for the training, the optimization criterion providing that the first group of the approximations of ground truths have the lower effect on the training than the second group of the approximations of ground truths that are of higher-approximation quality.

16. The non-transitory computer-readable medium of claim 15, wherein the optimization criterion is further based on an energy map of the measurement data.

17. The non-transitory computer-readable medium of claim 16, wherein the optimization criterion comprises a cross entropy between the measurement data and the approximations of ground truths.

18. The non-transitory computer-readable medium of claim 17, wherein the optimization criterion is based on a sum comprising a first summand based on the cross entropy and a second summand based on the energy map.

19. The non-transitory computer-readable medium of claim 14, wherein the non-transitory computer-readable medium comprises further instructions that, when executed, cause the processor of a computer system to:

filter out ones of the first group of the approximations of ground truths to provide the first group of the approximations of ground truths with the lower effect on the training than the second group of the approximations of ground truths.

20. A computer system configured to:

determine measurement data from a first sensor;

determine approximations of ground truths based on data from a second sensor; and train a machine-learning model based on the measurement data and the approximations of ground truths, wherein a first group of the approximations of ground truths are of lower-approximation quality, the training of the machine-learning model including training the machine-learning model to a first extent based on the first group of approximations of ground truths of the lower-approximation quality and training the machine-learning model to a second extent based on a second group of the approximations of ground truths that are of higher-approximation quality than the first group, wherein the second extent is greater than the first extent.

* * * * *